INVENTOR
ARTHUR E. KURTZ
JAMES L. DONMOYER

BY *Clifford B. Price*

ATTORNEY

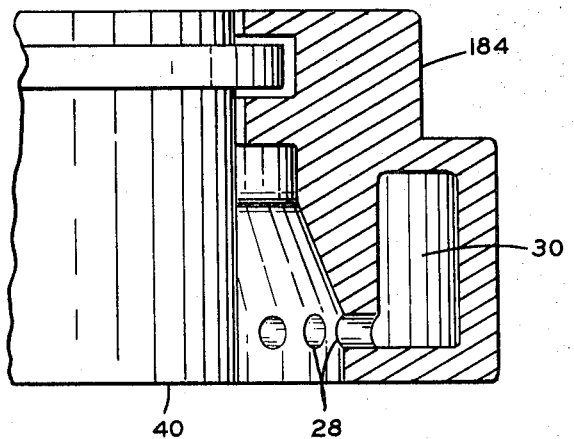

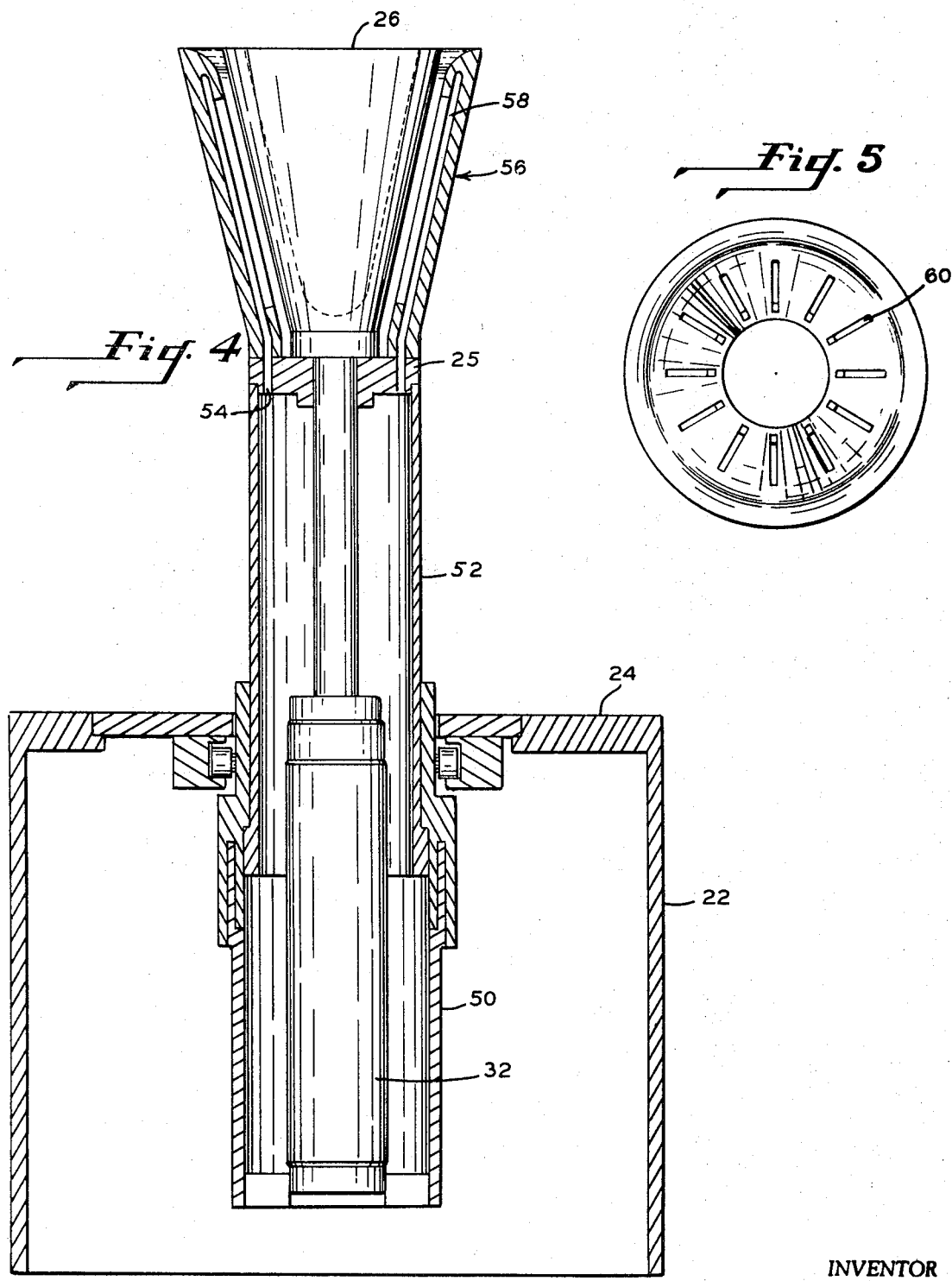

United States Patent Office 3,536,469
Patented Oct. 27, 1970

3,536,469
APPARATUS FOR UNIFORM COOLING OF GLASS MOLDING MACHINES
Arthur E. Kurtz, New Providence, and James L. Donmoyer, Elizabethtown, Pa., assignors, by mesne assignments, to Kerr Glass Manufacturing Corporation, Los Angeles, Calif., a corporation of Nevada
Filed Aug. 7, 1967, Ser. No. 658,676
Int. Cl. C03b 9/38
U.S. Cl. 65—307                    5 Claims

ABSTRACT OF THE DISCLOSURE

Method and apparatus for the constant and uniform cooling of selective parts of a glass making machine to permit the production of good quality glassware. The mold which is used to form the parison is continuously cooled by being subjected to a constant controllable stream of air. The neck ring which is used in conjunction with the parison mold to form the parison is also continuously cooled. Cooling of the neck ring is accomplished by the use of cored neck ring holders which permit the placing of a constant controllable stream of air against the outer surface of the neck ring for the parison. The method involved herein contemplates the uniform cooling within a glass making machine during the complete cycle of forming the glassware.

BACKGROUND OF THE INVENTION

Field of the invention

The invention is directed towards method and apparatus for forming hollow glassware in which the glassware is partially formed in a parison pressing operation. Specifically, the invention is directed towards the uniform cooling of the apparatus for forming the hollow glassware.

Description of the prior art

The prior art apparatus which is being specifically improved by the method and apparatus of this application is disclosed in U.S. Pat. No. 3,329,492. This particular glass forming machine is not provided with any specific cooling structure, but relies only upon ambient air to perform whatever cooling function may be performed.

In the glass making art, in general, it is known to provide apparatus for the cooling of selected parts of a glass forming machine. These machines utilize nozzle structures to direct a cooling stream of air towards certain portions of the glass forming apparatus when they are in their dwell positions. However, no glass forming machine to date has attempted to provide constant temperature, continuous cooling at an adjustably controlled rate to all the critical parts of a glass forming machine. The ability to cool selectively to maintain a relatively constant temperature situation has the advantage that it permits more uniform internal and external cooling of the finish surface of the glassware resulting in reduced temperature strains and checks which mar the glassware finish.

Since all known prior art cooling techniques only cool the critical parts during certain rest positions or partial cycle positions for the various parts of the glass forming machine, there is no continuous cooling in the glass forming machine. With this partial cooling, it is not possible to maintain uniform control of the cooling in a glass making machine.

SUMMARY OF THE INVENTION

The invention is directed to the method of providing uniform and constant cooling of the critical parts of a glass forming machine so that uniform temperature control may be secured. The uniform control is secured only through the use of continuous fluid cooling of the various forming molds for the glassware.

Specifically, the invention contemplates the applying of a constant air stream during the full cycle of operation of the neck ring. Air is forced along the tubing containing the operating structure for the neck ring holder. The air then passes through a cored neck ring holder and leaves the neck ring holder from exit ports which direct the air against the outer periphery of the neck ring. Such a structure provides for the continuous cooling of the neck ring during its full cycle of operation.

The invention also contemplates the continuous cooling of the parison mold during its full cycle of operation. Air is forced through the shield around the operating structure for the parison mold and directed by a nozzle-like structure against the outer periphery of the parison mold. Consequently, the parison mold is subjected to a cooling medium during its full cycle of operation.

BRIEF DESCRIPTION OF THE DRAWINGS

FIG. 3 is an enlarged sectional view of a neck ring holder containing a neck ring;

FIG. 4 is a sectional view of the cooling structure for a parison mold; and

FIG. 5 is a top view of a nozzle structure surrounding the parison mold.

DESCRIPTION OF THE PREFERRED EMBODIMENT

Figure 1:
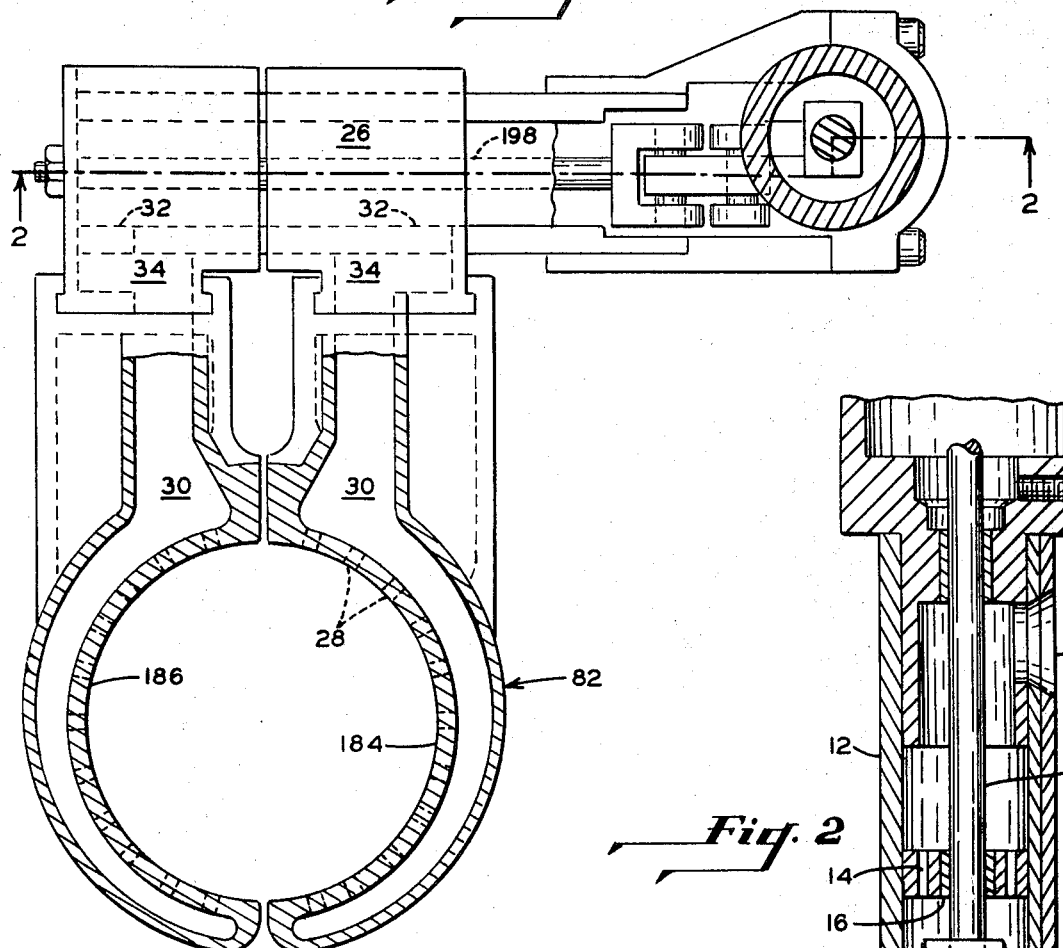
FIG. 1 is a top view, partly broken away, of the neck ring holder of a glass making machine.
Figure 2:
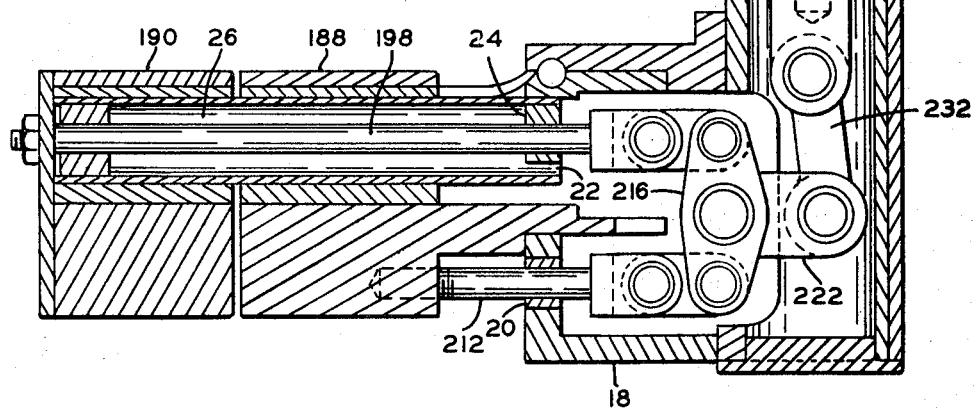
FIG. 2 is a sectional view along line 2—2 of FIG. 1.

Referring to FIGS. 1–3, there is disclosed a structure which provides the uniform cooling of the neck ring assembly. FIG. 1 of this application is similar to FIG. 6 of Pat. No. 3,329,492, while FIG. 2 of this application is similar to FIG. 7 of the above-mentioned patent. The basic operating structure of the patent and the neck ring assembly of this application are the same with the drawings differing only in those aspects which are necessary to show how the air is supplied to the neck ring assembly.

As indicated in the above-mentioned patent, the neck ring assembly comprises two separate arcuate neck ring holders which are secured to sleeve members 188 and 190. The sleeve members are movable between opened and closed positions whereby the sleeves and holders act as a set of vise fingers for holding and releasing the parison. The sleeve members are operated by rods 198 and 212. The rods in turn are actuated by a piston rod 228 and links 216, 222, and 232. This structure is identical with that disclosed in the above mentioned patent and shown in FIG. 7 of that patent.

The structure shown in FIG. 2 has been modified to permit the housing for the operating structure of the sleeve members 188 and 190 to function as an air passage. An opening 10 may be connected with any conventional adjustable air supply means. The air then passes down through the hollow tube 12, through apertures 14 in bearing 16, and into the open space surrounding the links 216, 222, and 232. A housing 18 cooperates with hollow tube 12 to define a closed area for containing the operating links. A seal 20 prevents the escape of air past the rod 212. The air must therefore flow through passageway 22 by bearing 24 into chamber 26 which surrounds rod 198.

Referring to FIG. 1, rod 198 and chamber 26 are shown in dotted lines at the upper left-hand corner of the figure. FIG. 1 of this application is similar to FIG. 6 of the above-mentioned patent. Neck ring holders 184 and 186 are part of the neck ring assembly 82, and the holders 184 and 186 are connected to the sleeves 188 and 190.

Movement of the sleeves between their opened and closed positions results in movement of the holders between open and closed positions. Neck ring holders 184 and 186 have inner walls for engaging a neck ring and outer walls. The space between the walls is cored to provide them with an internal passageway or chamber 30. A plurality of exit ports 28 vent the cored passageway 30 towards the inner area of the neck ring holders. The air is permitted to pass from chamber 26 through passages 32 in the tube structure carrying the sleeves 188 and 190. Air then passes through the passage 34 in the sleeves and then into the passageways 30 in the neck ring holders. Finally, it is vented through the ports 28 directly onto the neck ring.

With the above-described structure, it is now possible to move air from the air entrance 10, through tube 12, into the linkage chamber formed by tube 12 and housing 18, around rod 198 into chamber 26, from chamber 26 through passages 32 and 34 into passageway 30 in the neck ring holders. Through a series of ports 28 in the neck ring holders, the air then exits around the inner periphery of the neck ring holders. Referring to FIG. 3, the neck ring holder 184 is shown with its passage 30. As can be seen from FIG. 3 the arcuate inner walls of the respective neck ring holders are tapered downwardly and outwardly toward the outer walls thereof. The upper portion of the inner walls forms a neck ring gripping portion of a diameter compatible with the neck ring to be held with the lower tapered portion forming a cooling portion of larger diameter. The exit ports 28 are located in the lower cooling portion of the inner walls and are spaced outwardly from the point where the holders engage the neck ring. The exit ports 28 permit the passage of the air from the passage 30. The neck ring 40, which is carried by the holders and forms the neck of the parison, then has the air impinging against its lower surface. The total periphery of the neck ring is subjected to a constant stream of air whose volume can be controlled by conventional pressure control apparatus. Consequently, the cooling stream is continuous, is directed normally to the ring 40 from closely spaced ports, and, therefore, will permit the maintaining of a uniform temperature in the region of the neck ring 40.

FIGS. 4 and 5 are directed to a structure for providing uniform cooling of the parison mold. FIG. 4 is similar to the structure shown in FIG. 8 of Pat. No. 3,329,492. The conventional power cylinder 32 moves the parison mold 26 mounted at its base between its raised and lowered positions. The box frame 22 with the top plate 24 is a normally closed structure or supply chamber containing many of the operating components of the overall machine. Air through conventional adjustable means is applied to this box-like structure to maintain a positive air pressure therein. This air is channeled by the particular structure of this application so that a cooling stream of air will be constantly applied to the parison mold.

As can be seen in FIG. 4 a cooling system including an open-ended housing 50 is placed within the box-like structure around the power cylinder 32. A telescoping tube or sleeve 52 reciprocates within the housing 50 and is connected at its upper end to the yoke 25, illustrated as a disc in FIG. 4, upon which the parison mold 26 is normally mounted. Air may now pass from the box-like structure, through the lower end of the housing 50, through the tube 52 to the yoke structure 25. The yoke structure is provided with a plurality of uniformly spaced apertures 54, located in the illustrated embodiment adjacent to its periphery, to permit the passage of air therethrough.

An annular fluid distribution means or air distribution assembly 56 is mounted on the upper part of the yoke and in surrounding relationship to the parison mold 26. The assembly 56 is an inverted, truncated cone and corresponds generally to the outline of the parison mold. The assembly 56, as illustrated in FIGS. 4 and 5, is provided with an outer wall which extends above the telescoping tube and forms a flared extension thereof, and an inner wall connected to the outer wall along its upper periphery and extending downwardly to contact the upper surface of the yoke 25 to form a chamber or cored passage 58 between the outer and the inner walls with the yoke acting as the bottom wall. The inner wall is provided with a series of ports 60 in the form of uniformly spaced slots which permit cooling fluid from a suitable conventional source to pass out of the chamber 58 against the outside of the parison mold 26. The shape of the ports 60 may be varied from that illustrated without departing from the scope of the invention. As seen in FIG. 4 the inner wall of the assembly is spaced from the wall of the parison mold and defines a cavity closed at its lower extremity and open to the atmosphere at its upper extremity to form an outlet for the cooling fluid. Thus the cooling fluid flows upwardly along the parison mold to the outlet.

The five figures of the drawings show structures which are capable of applying a continuous flow of a cooling fluid to certain critical molding apparatus of a glass making machine. By controlling the exit port sizes and the volume of air exited through the ports, it will be possible to accurately control the amount of heat removal which the air will secure. Consequently, this structure permits one to maintain a uniform temperature within the operating and molding components of the glass making machine. While the structure disclosed is to be used primarily with air as the cooling means, it is well within the invention to contemplate the use of a liquid being pumped through a cored structure to accomplish the same cooling effect.

While there have been illustrated and described specific embodiments of this invention, further modifications and improvements will occur to those skilled in the art, and it is desired in the appendant claims, to cover all modifications which do not depart from the spirit and scope of this invention.

We claim:

1. A glass making apparatus comprising a parison mold mounted at its base for movement between a lowered and a raised position, and an annular fluid distribution means surrounding and spaced from said parison mold and generally conforming to the outer surface thereof, said distribution means comprising a chamber defined by an outer wall, an inner wall joined to said outer wall along its entire upper periphery and extending downwardly within said outer wall and a lower wall closing the lower edges of said inner and outer walls, said lower wall being provided with a series of apertures for connection with a source of cooling fluid, said inner wall and said parison mold defining an annular cavity closed at its lower extremity and open to the atmosphere at its upper extremity to form an outlet to the atmosphere along the upper rim of the parison mold, said inner wall being further provided with a series of ports extending therethrough whereby said cooling fluid is permitted to flow outwardly from said chamber and upwardly around said parison mold and through said outlet while retaining the ability to raise and lower said parison mold.

2. A glass making apparatus comprising a parison mold mounted on the shaft of a power cylinder for movement between a lowered and a raised position, a cooling system surrounding said power cylinder to define an annular path for cooling fluid, said cooling system comprising a telescoping tube extending above a closed supply chamber around said power cylinder and communicating with a source of cooling fluid, a yoke in the form of a disc positioned within said telescoping tube at its upper extremity and having a central opening closely surrounding the shaft of the power cylinder, said yoke having a plurality of apertures uniformly spaced around and adjacent to its periphery for communicating cooling fluid upwardly through said yoke from said telescoping tube and said source, and an annular fluid distribution means surrounding said parison mold and generally conforming to the outer surface thereof, said distribution means comprising a chamber defined by said yoke as a bottom wall, an outer wall extending above said telescoping tube and connected thereto, an inner wall connected to said outer wall along its entire upper periphery and extending downwardly within said outer wall to said yoke, said inner wall and said parison mold defining an annular cavity closed at its lower extremity by said yoke and open at its upper extremity to form an outlet to the atmosphere, said inner wall being further provided with a series of uniformly spaced ports extending therethrough whereby said cooling fluid is permitted to flow upwardly around said parison mold and through said outlet while retaining the ability to raise and lower said parison mold.

3. A glass making apparatus comprising a neck ring assembly having a pair of arcuate neck ring holders each having an arcuate inner wall and an outer wall and each being movable relative to the other so that said arcuate inner walls engage the periphery of a neck ring, each of said ring holders having a hollow chamber defined by and disposed between said inner and outer walls and communicating with a source of cooling fluid, each of said arcuate inner walls having a neck ring gripping portion of one diameter and a cooling portion of a larger diameter, said inner walls each further having a plurality of exit ports on said cooling portion adapted to be positioned around the periphery of said neck ring and spaced therefrom to permit flow of said cooling fluid from said chamber and directly onto the surface of said neck ring in a continuous manner.

4. An apparatus as set forth in claim 3 wherein the arcuate inner wall of each of said holders is tapered outwardly from said contact portion to said cooling portion and wherein said exit ports are positioned adjacent the lower peripheries of said inner walls at the point of largest diameter and are spaced outwardly and downwardly from the points of contact of the neck ring holders with said neck ring.

5. An apparatus as set forth in claim 2, further comprising a neck ring assembly including a separate cooling means in the form of neck ring holders having hollow chambers connected to a source of cooling fluid and a series of exit ports on each of said holders to communicate cooling fluid from said chambers directly against a neck ring while it is held.

References Cited

UNITED STATES PATENTS

| | | | |
|---|---|---|---|
| 2,901,865 | 9/1959 | McCormick | 65—356 |
| 2,928,214 | 3/1960 | Mumford | 65—356 |
| 3,094,404 | 6/1963 | Lauck | 65—356 X |
| 3,249,418 | 5/1966 | Irwin et al. | 65—267 X |

ARTHUR D. KELLOGG, Primary Examiner

U.S. Cl. X.R.

65—267, 356